Figure 1:
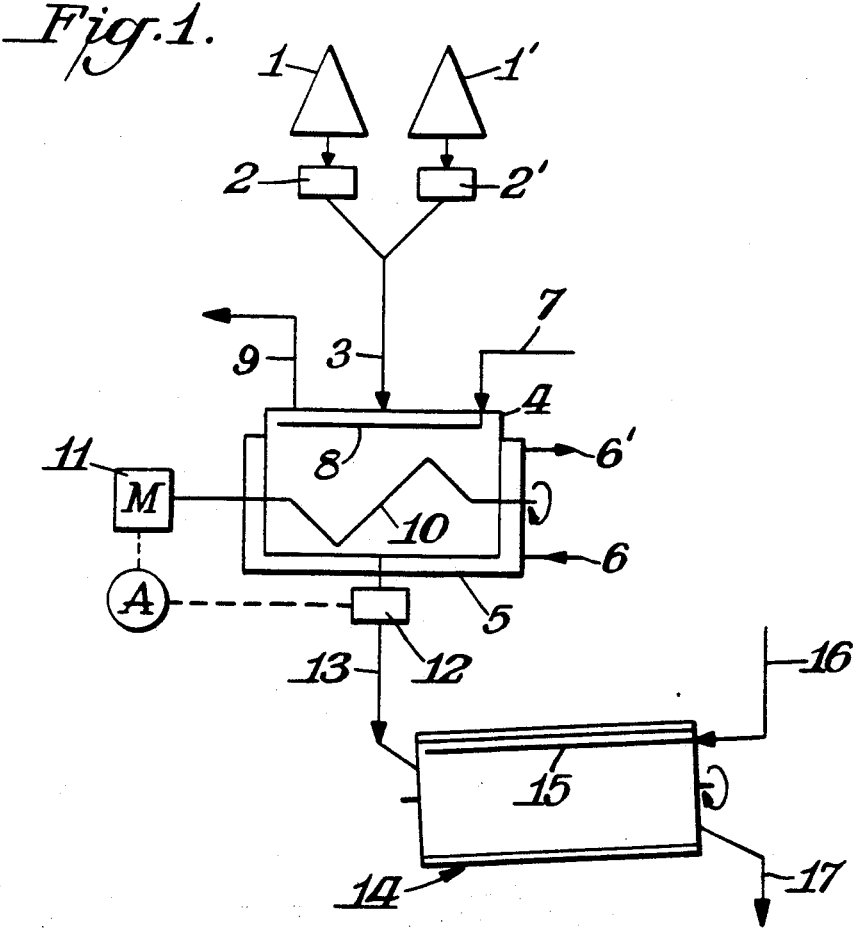

United States Patent [19]

Staffel et al.

[11] Patent Number: 5,158,752
[45] Date of Patent: Oct. 27, 1992

[54] PLANT FOR PRODUCING AMMONIUM POLYPHOSPHATE

[75] Inventors: Thomas Staffel, Hürth; Günther Schimmel, Erftstadt; Horst Buhl, Erftstadt; Jürgen Grosse, Erftstadt, all of Fed. Rep. of Germany

[73] Assignee: Hoechst Aktiengesellschaft, Frankfurt am Main, Fed. Rep. of Germany

[21] Appl. No.: 657,532

[22] Filed: Feb. 19, 1991

[30] Foreign Application Priority Data

Mar. 5, 1990 [DE] Fed. Rep. of Germany ....... 4006862

[51] Int. Cl.$^5$ ............................................. C01B 15/16
[52] U.S. Cl. ................... 422/135; 422/108; 422/110; 422/229; 423/305
[58] Field of Search ............... 422/135, 229, 108, 110; 423/305

[56] References Cited

U.S. PATENT DOCUMENTS

| | | | |
|---|---|---|---|
| 3,171,733 | 3/1965 | Hignett et al. | 71/48 |
| 3,397,036 | 8/1968 | Narins et al. | 423/305 |
| 3,503,706 | 3/1970 | Legal, Jr. | 423/305 |
| 3,533,737 | 10/1970 | Farr et al. | 423/305 |
| 3,653,821 | 4/1972 | Heymer et al. | 23/106 |
| 3,684,724 | 8/1972 | Dyer et al. | 252/135 |
| 3,949,058 | 4/1976 | Young et al. | 423/313 |
| 3,978,195 | 8/1976 | Schrödter et al. | 423/305 |
| 4,028,088 | 6/1977 | Young et al. | 71/28 |
| 4,150,101 | 4/1979 | Schmidt et al. | 423/338 |
| 4,511,546 | 4/1985 | Schrödter et al. | 423/305 |
| 4,797,080 | 1/1989 | Wanninger | 425/203 |

FOREIGN PATENT DOCUMENTS

| | | |
|---|---|---|
| 1441449 | 6/1976 | United Kingdom . |
| 2116158 | 9/1983 | United Kingdom ................ 423/305 |

Primary Examiner—Lynn M. Kummert
Assistant Examiner—Christopher Y. Kim
Attorney, Agent, or Firm—Connolly and Hutz

[57] ABSTRACT

A plant for producing chain-type ammonium polyphosphate from ammonium orthophosphate and phosphorus pentoxide in the presence of gaseous ammonia comprises a reactor having rotatable mixing, kneading and comminuting tools in its interior and a feed pipe for the solid starting materials, an introduction pipe for ammonia, a gas discharge pipe and a discharge line for the reaction product, all of which are flow-connected to the interior of the reactor. The discharge line of the reactor is also connected for material flow to a mixing apparatus. A discharge device, which is controlled by the power consumption of the drive motor of the reactor, is arranged in the discharge line.

8 Claims, 1 Drawing Sheet

PLANT FOR PRODUCING AMMONIUM POLYPHOSPHATE

The present invention relates to a plant for producing essentially water-insoluble, chain-type ammonium polyphosphate from ammonium orthophosphate and phosphorus pentoxide in the presence of gaseous ammonia, which is composed of a reactor having rotatable mixing, kneading and comminuting tools in its interior and a feed pipe for the solid starting materials, an introduction pipe for ammonia, a gas discharge pipe and a discharge line for the reaction product, which pipes are flow-connected to the interior of the reactor.

U.S. Pat. No. 3,978,195 has disclosed a process for producing essentially water-insoluble, chain-type ammonium polyphosphates, wherein equimolar quantities of ammonium orthophosphate and phosphorus pentoxide are reacted in the presence of ammonia at temperatures between 170° and 350° C. with continuous mixing, kneading and comminuting, the rotation in the first phase with pasty reaction mixture being at a relatively low speed (15 to 21 rpm) and in a second phase after formation of a finely dispersed product being at a high speed (49 to 64 rpm), so that a kind of fluidized bed is formed from the product. As the apparatus for mixing, kneading and comminuting the feed materials or the reaction product, a reactor provided with mixing tools is used in this case, two double-Z blades rotatable about their horizontal axes arranged in parallel serving as the mixing tools.

The disadvantage in this case is that the reactor designed as a kneader must be of stable construction because of the high mechanical stress applied to it. Furthermore, its interior and the double-Z blades must be composed of a highly wear-resistant metal alloy. The equipment is therefore very investment-intensive.

It has now been found, surprisingly, that such an expensive kneader is indispensable for the first phase of the production of ammonium polyphosphate, namely for the mixing of ammonium orthophosphate and phosphorus pentoxide and for the kneading of the pasty mass, but that, after disintegration of the pasty mass into a crumbly product, a less expensive mixing apparatus can be used in the second phase.

In detail, the present invention relates to a plant for producing essentially water-insoluble, chain-type ammonium polyphosphate, which comprises a reactor having rotatable mixing, kneading and comminuting tools, the discharge line of the reactor being connected for material flow to a mixing apparatus, a discharge device being arranged in the discharge line and the discharge device being controlled by the power consumption of the drive motor of the reactor.

As desired, the plant according to the invention can also be further developed by
a) the mixing apparatus being a rotary kiln,
b) the mixing apparatus being a disk drier,
c) the mixing apparatus being a fluidized-bed reactor,
d) the mixing apparatus being a kneading mixer,
e) a bunker being arranged for material flow between the reactor and the mixing apparatus,
f) the bunker being a hot bunker,
g) the bunker being provided with a device for comminuting agglomerates, and
h) during each batch in the reactor, the discharge device being opened after passing through the second power peak in the power consumption/time diagram of its drive motor and being closed after emptying of the reactor.

In the plant according to the invention, additional mechanical energy is required when the material located in the kneader changes from the pasty mass to the crumbly product. This additional energy requirement manifests itself as a peak, which is used as the control variable, in the power consumption/time diagram of the electric motor driving the kneader.

A plant according to the invention is diagrammatically represented in the attached drawing in which:

FIG. 1: shows the actual plant in section, and

Figure 2:
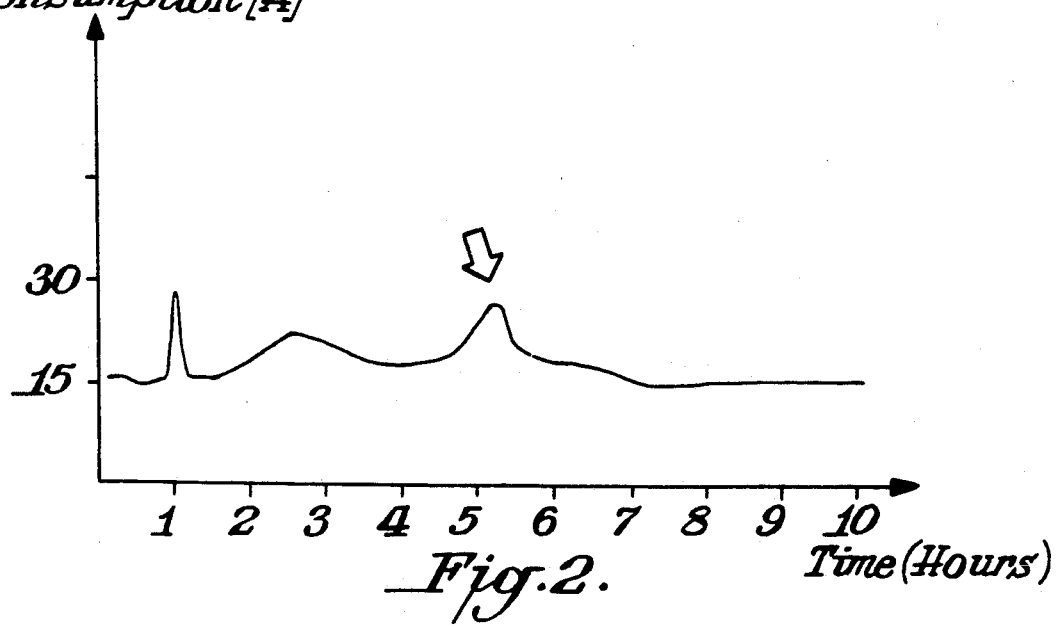

FIG. 2: shows the power consumption curve of the drive motor M of the reactor.

The solid raw materials (ammonium orthophosphate and phosphorus pentoxide) are fed from stock vessels (1, 1') via weighing devices (2, 2') through a feed line 3 into the reactor 4. The reactor 4 is composed of a closed trough which is provided with a heating jacket 5 which has branches (6, 6') for the supply and discharge of a heating medium. In the upper region of the reactor 4, a first gas distribution pipe 8 is arranged which can be charged with ammonia via a first gas feed pipe 7. Excess ammonia can escape via a waste gas line 9. In the reactor 4, there are rotating tools 10 which are fixed to a horizontal axle.

A rotary kiln 14 is connected for material flow to the lower region of the reactor 4 via a discharge line 13, in which a shut-off device 12 is located. This shut-off device 12 is controlled as a function of the power consumption of the drive motor 11 on the reactor 4 in such a way that the shut-off device 12 is opened after a second power peak has been passed through (see FIG. 2—arrow). In the rotary kiln 14, a second gas distribution pipe 15 is located which can be charged with ammonia via a second gas feed pipe 16. In addition, the rotary kiln 14 is provided with a discharge pipe 17.

Since a rotary kiln can, like a disk drier or fluidized-bed reactor, only be operated continuously, but reaction material can be discharged only discontinuously from the reactor designed as a kneader, a bunker, which is not shown, must be located as intermediate storage in the flow between the reactor and the rotary kiln. For energy reasons, the bunker should be designed as a hot bunker and be provided with a device for comminuting agglomerates. When a kneading mixer is used as the mixing apparatus, the bunker can be omitted in batch operation.

In the table which follows, ammonium polyphosphates, which are obtained in the plant according to the invention, are listed with respect to their characteristics determined by chemical and X-ray analysis (pH value, acid number, water-soluble fractions, viscosity) and compared with the specification for grade ®Exolit 422 (HOECHST AG, Frankfurt; 1989).

TABLE

| No. | Temperature °C. | Residence Time hours | pH value | Acid number mg of KOH/g | Water-soluble fraction % | Viscosity mPa·s |
|---|---|---|---|---|---|---|
| ®Exolit 422 Specification | | | 5.5 ± 1.0 | <1 | <10 | <100 |
| Rotary kiln | | | | | | |
| 1 | 270 | 1 | 5.0 | 0.36 | 2.1 | 28 |
| 2 | 280 | 2 | 6.1 | 0.22 | 3.1 | 82 |
| 3 | 280 | 4 | 6.3 | 0.40 | 4.2 | 20 |
| Disk drier | | | | | | |
| 4 | 280 | 1 | 6.4 | 0.95 | 4.2 | 22 |
| 5 | 280 | 2 | 6.2 | 0.42 | 3.0 | 22 |

TABLE-continued

| No. | Temperature °C. | Residence Time hours | pH value | Acid number mg of KOH/g | Water-soluble fraction % | Viscosity mPa·s |
|---|---|---|---|---|---|---|
| ®Exolit 422 Specification | | | 5.5 ± 1.0 | <1 | <10 | <100 |
| Fluidized-bed reactor | | | | | | |
| 6 | 280 | 0.5 | 6.5 | 0.1 | 4.0 | 29 |
| Kneading Mixer (LÖDIGE) | | | | | | |
| 7 | 240 | 3 | 6.0 | 0.4 | 1.9 | 30 |
| 8 | 250 | 2 | 5.8 | 0.5 | 1.9 | 28 |
| 9 | 275 | 4 | 6.0 | 0.4 | 1.9 | 32 |
| Kneading Mixer (KRAUS-MAFFEI) | | | | | | |
| 10 | 280 | 1.6 | 5.9 | 0.39 | 3.4 | 43 |
| 11 | 280 | 1.1 | 4.9 | 0.67 | 2.7 | 36 |

We claim:

1. A plant for producing linear, water-insoluble ammonium polyphosphate from ammonium orthophosphate and phosphorus pentoxide in the presence of gaseous ammonia, which comprises a reactor being penetrated by a vertically arranged shaft with mixing kneading and comminuting tools fastened to said shaft, said shaft being rotatable by a drive motor equipped with a power consumption meter connected to said drive motor; a feed pipe for ammonium orthophosphate and phosphorus pentoxide, an introduction pipe for ammonia and an off-gas pipe, said feed pipe, said introduction pipe, and said off-gas pipe penetrating the upper portion of the reactor and being fluidly connected to its interior; a discharge line penetrating the bottom portion of the reactor and terminating in a mixing apparatus; a shut-off device arranged in the discharge line, said device being controlled by said power consumption meter to be openable to empty the reactor contents and thereafter closed.

2. The plant as claimed in claim 1, wherein the mixing apparatus is a rotary kiln.

3. The plant as claimed in claim 1, wherein the mixing apparatus is a disk drier.

4. The plant as claimed in claim 1, wherein the mixing apparatus is a fluidized-bed reactor.

5. The plant as claimed in claim 1, wherein the mixing apparatus is a kneading mixer.

6. The plant as claimed in claim 1, wherein a collecting vessel is arranged between the reactor and the mixing apparatus.

7. The plant as claimed in claim 6, wherein the collecting vessel is provided with a device for comminuting agglomerates.

8. In a process for producing linear, water-insoluble ammonium polyphosphate in a plant from ammonium orthophospate and phosphorous pentoxide in the presence of gaseous ammonia wherein ammonium orthophospate and phosphorous pentoxide are fed into a reactor having a vertically arranged shaft with mixing, kneading, and comminuting tools fastened to said shaft and said shaft being rotatable by a drive motor, and linear, water-insoluble ammonium polyphospate is discharged, wherein the improvement comprises providing a drive motor equipped with a power consumption meter connected to said drive motor, which meter produces a power consumption/time diagram showing a first peak and a second peak during each batch in the reactor; providing a feed pipe for ammonium orthophosphate and phosphorus pentoxide, an introduction pipe for ammonia and an off-gas pipe, said feed pipe, said introduction pipe, and said off-gas pipe penetrating the upper portion of the reactor and being fluidly connected to its interior; providing a discharge line penetrating the bottom portion of the reactor and terminating in a mixing apparatus; providing a shut-off device arranged in the discharge line; and controlling the shut-off device using the power consumption meter to open the device in the event of passing the appearance of the second peak in the power consumption/time diagram and to close the device after emptying the reactor.

* * * * *